(12) United States Patent
Dosenbach

(10) Patent No.: US 12,157,529 B2
(45) Date of Patent: Dec. 3, 2024

(54) WHEELCHAIR ACCESSIBLE VEHICLE HAVING A SWING DOOR AND MODIFICATION METHODS THEREFOR

(71) Applicant: The Braun Corporation, Winamac, IN (US)

(72) Inventor: Eric Sajed Dosenbach, Indianapolis, IN (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 18/613,259

(22) Filed: Mar. 22, 2024

(65) Prior Publication Data

US 2024/0317338 A1    Sep. 26, 2024

Related U.S. Application Data

(60) Provisional application No. 63/491,552, filed on Mar. 22, 2023.

(51) Int. Cl.
| | |
|---|---|
| *B62D 65/02* | (2006.01) |
| *A61G 3/02* | (2006.01) |
| *E05D 3/02* | (2006.01) |
| *B60J 5/04* | (2006.01) |

(52) U.S. Cl.
CPC .............. *B62D 65/02* (2013.01); *E05D 3/02* (2013.01); *A61G 3/02* (2013.01); *B60J 5/047* (2013.01); *E05Y 2600/50* (2013.01); *E05Y 2900/531* (2013.01)

(58) Field of Classification Search
CPC .................................. B62D 65/02; E05D 3/02
See application file for complete search history.

(56) References Cited

U.S. PATENT DOCUMENTS

| | | | |
|---|---|---|---|
| 9,605,466 B2 | 3/2017 | Wojdyla et al. | |
| 9,789,922 B2 | 10/2017 | Dosenbach et al. | |
| 11,548,428 B2 | 1/2023 | Smith et al. | |

(Continued)

FOREIGN PATENT DOCUMENTS

| | | | | |
|---|---|---|---|---|
| CN | 115110850 A | * | 9/2022 | ............... E05D 3/02 |
| WO | WO-2018117615 A1 | * | 6/2018 | ................ B60J 5/04 |

OTHER PUBLICATIONS

English translation CN115110850 (Year: 2022).*

(Continued)

*Primary Examiner* — Jason L Vaughan
*Assistant Examiner* — Amanda Kreiling
(74) *Attorney, Agent, or Firm* — Daniel Tallitsch

(57) ABSTRACT

To permit wheelchair access, a door assembly of an OEM vehicle may be modified with a replacement door hinge that increases the door swing angle while maintaining clearances between door and a front door assembly, the vehicle body, and a wheelchair ramp installed in the door opening. To preserve the door's OEM closed position, the replacement door hinge (when in the closed position) may match the geometry between the OEM hinge's door and vehicle connection points. Additionally or alternatively, the door assembly may be modified to include a powered door opening assembly comprising a slider block configured with a motor to reciprocate along a width of the door and a connecting rod pivotally coupled between the vehicle and the slider block.

24 Claims, 11 Drawing Sheets

(56) References Cited

U.S. PATENT DOCUMENTS 11,585,137 B2 2/2023 Zindler et al.
2023/0039385 A1 2/2023 Peterson et al.

OTHER PUBLICATIONS

English translation WO2018117615 (Year: 2018).*
Invitation to Pay Additional Fees and, Where Applicable, Protest Fee and Provisional Opinion Accompanying the Partial Search Result of the International Searching Authority for PCT/US2024/020631, Jul. 30, 2024, 12 pages, International Searching Authority for the European Patent Office.
International Search Report, Search Strategy, and Written Opinion of the International Searching Authority for PCT/US2024/020631, Sep. 26, 2024, 18 pages, International Searching Authority for the European Patent Office.

* cited by examiner

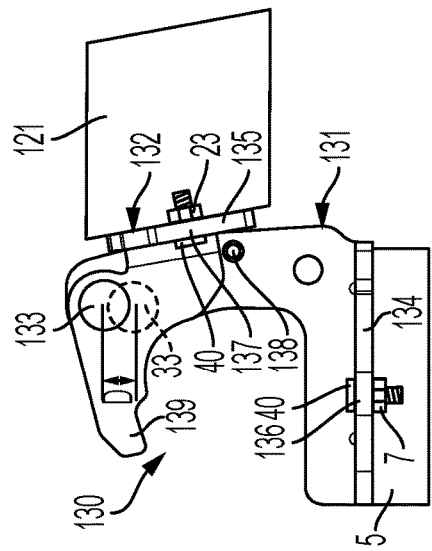
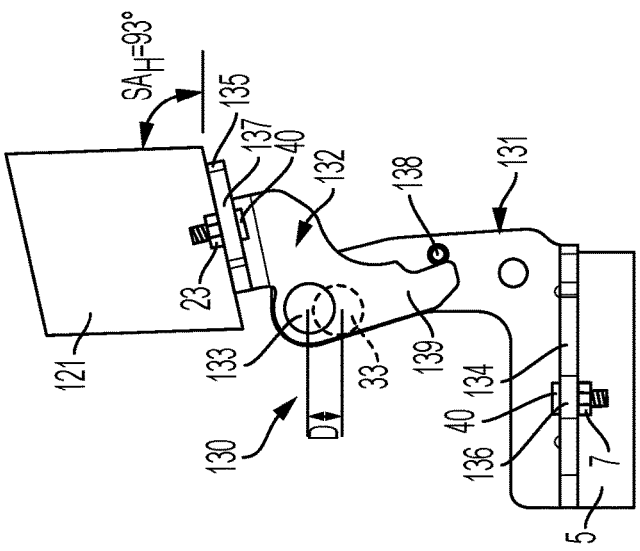
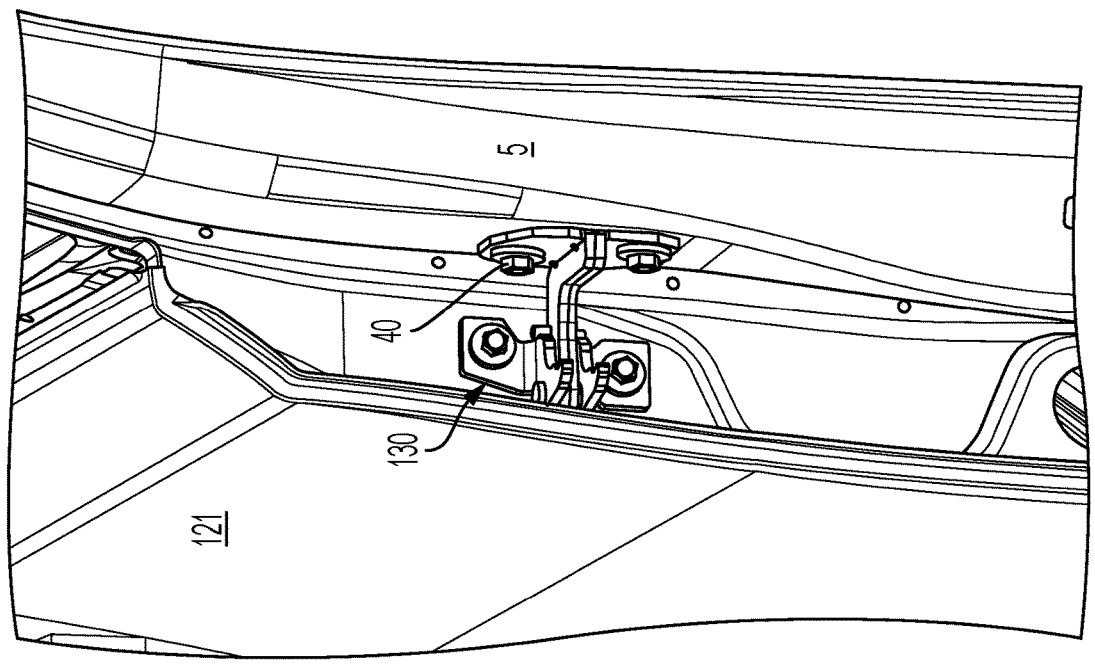
FIG. 7
FIG. 8
FIG. 6

WHEELCHAIR ACCESSIBLE VEHICLE HAVING A SWING DOOR AND MODIFICATION METHODS THEREFOR

CROSS REFERENCE TO OTHER APPLICATION

This application claims priority to U.S. Provisional Application No. 63/491,552, filed on Mar. 22, 2023, the contents of which are incorporated herein by reference. PCT application No. PCT/US24/20631 filed on Mar. 20, 2024, is also incorporated herein by reference.

FIELD OF THE DISCLOSURE

The present disclosure relates generally to a passenger vehicle that has been modified to allow access by a physically limited passenger, and more particularly to an OEM swing door that has been modified to increase the swing angle and/or to include a powered door opener.

BACKGROUND

Automobile manufacturers do not currently mass-produce passenger vehicles specifically designed to transport passengers having mobility impairments, either as a driver or as a non-driving passenger. Consequently, mass-produced passenger vehicles (hereinafter original equipment manufacturer or "OEM" vehicles) are often modified, or retrofitted, by aftermarket companies dedicated to supplying vehicles to passengers with mobility impairments. Such vehicles can be modified by removing certain parts or structures within a vehicle and/or installing parts specifically designed to accommodate the unique condition of the passenger. For example, in one configuration, a vehicle may be retrofitted with a ramp installed on or in a lowered floor surface to enable an individual using a wheelchair to enter the vehicle without the assistance of another individual. See, for example, U.S. Pat. No. 11,548,428, U.S. Patent Application Publication No. 2023/0039385, and U.S. Patent Application Ser. No. 63/398,651, filed on Aug. 17, 2022, all of which are incorporated herein by reference. In side-entry wheelchair accessible vehicles, the ramp is typically installed at the curb/passenger side rear door. Aside from ramps, other level change or wheelchair access devices are known, including wheelchair lifts.

Unfortunately, OEM rear passenger swing doors are not designed with mobility impaired passengers in mind. For instance, OEM swing doors typically have a limited swing angle and, as such, significantly block the full extent of the door opening when open. For example, the rear door assembly 20 for an example existing sport utility vehicle 1 is shown in FIG. 1. Notably, the usable width ($W_U$) of the OEM rear door assembly 20 is only a fraction (roughly 50% or less) of the available width ($W_A$) of the door opening 22 (for a ramp/lift application), largely because the obstructive width ($W_O$) of the rear door 21 in the door opening 22 comprises a majority of the available width ($W_A$) of the door opening 22. In most cases, the usable width ($W_U$) of an OEM door assembly 20 is too small to accommodate standard-width ramps and wheelchairs. Indeed, a usable width ($W_U$) of at least 30 inches (76.2 cm), and possible more, is typically required.

Vehicle converters have attempted to increase the usable width ($W_U$) of rear door assemblies 20 by replacing the OEM door hinges with a complex link mechanism, whereby the door 21 mimics a sliding door typically used with a minivan. Rather than pivoting away from the vehicle about the OEM hinges mounted to the vehicle's B-pillar 5, the link mechanism is configured to move the entire door 21 outward and rearward at least partially past the vehicle's C-pillar 6 until the door 21 is disposed in a position approximately parallel with the side of the vehicle and at least mostly rearward and clear of the available door opening width ($W_A$). In that regard, the obstructive width ($W_O$) of the door 21 in the door opening 22 can be reduced, with a resultant increase in the usable width ($W_U$) of the door assembly 20. See, for example, U.S. Pat. Nos. 9,605,466 and 11,585,137, both of which are incorporated herein by reference. Vehicle converters have also widened door openings by removing portions of the B-pillar 5 and/or C-pillar 6 of the vehicle, which increases the available door opening 22 width ($W_A$) and consequently the usable width ($W_U$) of the door assembly 20. See, for example, U.S. Pat. No. 9,789,922, which is incorporated herein by reference.

While the prior art modified doors and door openings can be used to successfully increase the usable width ($W_U$) of the door assembly 20 and/or reduce the obstructive width ($W_O$) of the door 21, those solutions still have drawbacks, including complexity and cost.

SUMMARY OF THE EMBODIMENTS

The embodiments described herein solve at least some of the problems of the prior art.

In one such embodiment, a method of modifying an existing vehicle is provided. The existing vehicle includes a door assembly comprising at least a first hinge connecting a door to a vehicle body at a door opening. The door is pivotable about a first hinge axis of the first hinge relative to the vehicle body between an original closed position and an original fully open position. The method may comprise the step of modifying the door assembly whereby the door is pivotable about a second hinge axis relative to the vehicle body between a modified closed position and a modified fully open position. The modified fully open position may be different from the original fully open position, wherein an obstructive width of the door blocking the door opening may be decreased in the modified fully open position.

In another embodiment, another method of modifying an existing vehicle is provided. The existing vehicle includes a door assembly comprising at least a first hinge connecting a door to a vehicle body at a door opening. The door is pivotable about a first hinge axis of the first hinge relative to the vehicle body between an original closed position and an original fully open position. The method may comprise the step of modifying the door assembly whereby the door is pivotable about a second hinge axis relative to the vehicle body between a modified closed position and a modified fully open position. The second hinge axis may be on a same side of the door as the first hinge axis, and the modified fully open position may be different from the original fully open position wherein a usable width of the door opening may be increased in the modified fully open position.

In one implementation of the previous embodiment, the method may include the step of replacing the first hinge with a second hinge connecting the door to the vehicle body at the door opening whereby the door may be pivotable about the second hinge axis of the second hinge relative to the vehicle body between the modified closed position and the modified fully open position.

In another implementation, a first swing angle defined between the original fully open position and the original closed position is greater than a second swing angle defined between the modified fully open position and the modified closed position.

In another implementation, the first swing angle is less than 90°.

In another implementation, the second swing angle is in the range of approximately 90° to 95°.

In another implementation, the second swing angle is in the range of approximately 90° to 100°.

In another implementation, the second swing angle is approximately 90° or greater.

In another implementation: the door is a rear passenger door; the existing vehicle further includes a front passenger door; the front passenger door is moveable between a closed position and a fully open position when the rear passenger door is in the modified fully open position.

In another implementation, the modified closed position is substantially the same as the original closed position.

In another implementation, the second hinge axis is different from the first hinge axis.

In another implementation, the second hinge axis is substantially parallel to and offset a distance from the first hinge axis.

In another implementation, the distance includes a laterally outward component relative to the vehicle body.

In another implementation, the door does not hit any portion of the existing vehicle in the modified fully open position.

In another implementation, the first hinge includes a first body flange for attachment to the vehicle body and a first door flange for attachment to the door, the first body flange being coupled to the first door flange at the first hinge axis whereby the first door flange is pivotable about the first hinge axis relative to the first body flange to permit the door to move between the closed position and the original fully open position.

In another implementation, the second hinge includes a second body flange for attachment to the vehicle body and a second door flange for attachment to the door, the second body flange being coupled to the second door flange at the second hinge axis whereby the second door flange is pivotable about the second hinge axis relative to the second body flange to permit the door to move between the closed position and the modified fully open position.

In another implementation, the first body flange is attached to a body fastener point on the vehicle body; the first door flange is attached to a door fastener point on the door; and, the method further comprises the step of securing the second body flange to the body fastener point and the second door flange to the door fastener point.

In another implementation: at least one body fastener attaches the first body flange to a body fastener point on the vehicle body; at least one door fastener attaches the first door flange to a door fastener point on the door; and the method further comprises the step of: securing the second body flange to the body fastener point and the second door flange to the door fastener point using the at least one body fastener and the at least one door fastener.

In another implementation, the body fastener point and the door fastener point each comprises at least one threaded bore.

In another implementation, the body faster point is disposed on a B-pillar of the existing vehicle.

In another implementation, the method may include the step of modifying the first hinge to be substantially the same as the second hinge.

In another implementation, the method may include the step of installing the modified first hinge in a second existing vehicle.

In another implementation, the existing vehicle includes a door check link preventing the door from opening past the original fully open position, the method further comprising the step of removing the door check link.

In another implementation, the existing vehicle includes a door check link preventing the door from opening past the original fully open position, the method further comprising the step of modifying a door check link to permit the door to open to the modified fully open position.

In another implementation, the existing vehicle includes a first door check link preventing the door from opening past the original fully open position, the method further comprising the step of replacing the first door check link with a second door check link, whereby the second door check link allows the door to open to the modified fully open position.

In another embodiment, a wheelchair accessible vehicle is provided with a vehicle body supported by one or more wheels; a front door disposed at a front door opening between an A-Pillar and a B-Pillar; a rear door disposed at a rear door opening between the B-Pillar and a C-Pillar. At least one hinge connects the rear door to the B-Pillar, whereby the rear door is pivotable about a hinge axis of the at least one hinge relative to the vehicle body between a rear door closed position and a rear door fully open position. A swing angle defined between the rear door fully open position and the rear door closed position is greater than approximately 90°. The front door is moveable between a front door closed position and a front door fully open position when the rear door is in the rear door fully open position.

In another embodiment, a powered door opening assembly for a vehicle is provided. The vehicle has a vehicle body and a door pivotably connected about the vehicle body at a hinge. The powered door opening assembly may include a slider block, a pivot link and a motor. The pivot link may be adapted for coupling between the vehicle body and the slider block, whereby the pivot link is pivotable about the vehicle body. The slider block may adapted to be coupled to the door and to reciprocate relative to one of the pivot link and the door. The motor assembly may configured to engage with at least one of the pivot link, the door, and the slider block to power the door between an open position and a closed position.

In another embodiment, a powered door opening assembly for a vehicle is provided. The vehicle has a vehicle body and a door pivotably connected about the vehicle body at a hinge. The powered door opening assembly may include a fourbar mechanism and a motor assembly. The fourbar mechanism may be configured for coupling to the vehicle body and the door, whereby the vehicle body will serve as a ground link and the door serves as a rocker link. The motor assembly may be configured for coupling to the fourbar mechanism and for powering the door between an open position and a closed position.

In one implementation of at least one of the previously described power door opening assemblies, the fourbar mechanism is a fourbar slider-crank mechanism.

In another implementation, the fourbar slider-crank mechanism includes a slider block and a pivot link; the pivot link is adapted for coupling between the vehicle body and the slider block, whereby the pivot link is pivotable about the vehicle body; and, the slider block is adapted to be coupled to the door and to reciprocate relative to one of the pivot link and the door.

In another implementation, the slider block is adapted to reciprocate relative to the door.

In another implementation, the pivot link pivots about the slider block.

In another implementation, the motor assembly comprises a linear actuator coupled at a first end to the door and at a second end to the slider block.

In another implementation, the motor assembly comprises a mechanical advantage system.

In another implementation, the mechanical advantage system couples the motor to the slider block.

In another implementation, the mechanical advantage system comprises at least one pulley coupled to the slider block and at least one cable coupling the motor to the pulley.

In another implementation: the at least one pulley coupled to the slider block comprises a first pulley coupled to the slider block and a second pulley coupled to the slider block; the at least one cable comprises an open loop cable adapted to be fixed to the door at both a first end and a second end; and, the open loop cable extends from its first end to the first pulley, from the first pulley to the motor, from the motor to the second pulley, and from the second pulley to the second end.

In another implementation, the mechanical advantage system further comprises a third pulley and a fourth pulley coupled to the door, wherein the third pulley engages with the open loop cable between the first pulley and the motor and the fourth pulley engages with the open loop cable between the motor and the second pulley.

In another implementation, the motor assembly comprises a rack and pinion assembly for reciprocating the slider block.

In another implementation, the rack and pinion assembly comprises a rack coupled to the slider block and a pinion coupled to a motor of the motor assembly, whereby the motor is configured to be coupled to the door.

In another implementation, the slider block is adapted to reciprocate relative to the pivot link.

In another implementation, the slider block pivots about the door.

In another implementation, the motor assembly is coupled to at least one of the pivot link and the slider block.

In another implementation, any of the previous implementations of the powered door assembly may be combined with the vehicle.

In another implementation, a vehicle modified according to any implementation of the methods described above may be combination with any of the previous implementations of the powered door assembly.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 6 is a perspective view of a replacement/modified door hinge of the modified rear door assembly of FIG. 5 with the modified rear door in a closed position.

FIG. 7 is a top view of the replacement/modified door hinge of FIG. 6 with the modified rear door in a closed position.

FIG. 8 is a top view of the replacement/modified door hinge of FIG. 7 with the modified rear door in the in the fully open position.

Corresponding reference numerals are used to indicate corresponding parts throughout the several views.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure. Any alterations and further modifications in the described embodiments and any further applications of the principles of the inventions as described herein are contemplated as would normally occur to one skilled in the art.

Although a limited number of embodiments are shown and described, it will be apparent to those skilled in the art that some features that are not relevant to the claimed inventions may not be shown for the sake of clarity.

Figure 1:
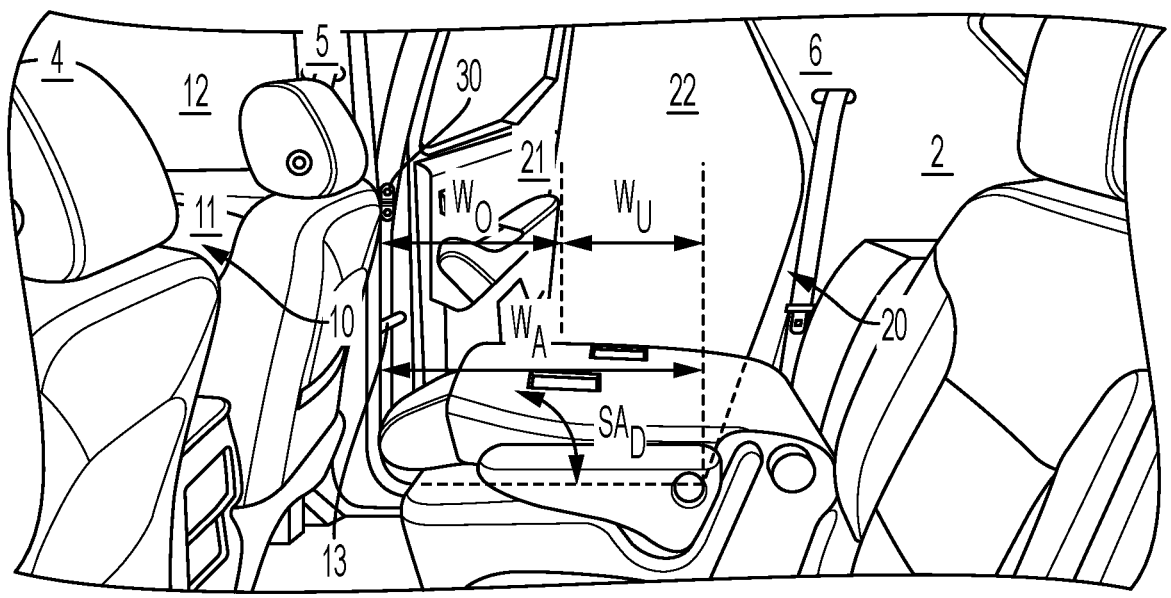
FIG. 1 illustrates an interior of an existing, prior art vehicle with the rear door in a fully open position.

As discussed briefly in the Background section above, FIG. 1 illustrates an interior of an existing, prior art vehicle 1 as provided by an OEM. The vehicle 1 comprises a vehicle body 2 supported by a plurality of wheels (not shown) and a front door assembly 10 adjacent a rear door assembly 20. The front door assembly 10 includes a front door 11 disposed between an A-pillar 4 and a B-pillar 5. The front door 11 is attached to the A-Pillar 4 via a hinge (not shown), whereby the front door 11 can pivot relative to the vehicle body 2 between a closed position (shown) and an open position. The rear door assembly 20 includes a rear door 21 disposed between the B-pillar 5 and a C-pillar 6. The rear door 21 is attached to the B-Pillar 5 via at least one hinge 30, whereby the rear door 11 can pivot relative to the vehicle body 2 between a closed position (not shown) and a fully open position (shown in FIG. 1). The swing angle ($SA_D$) of the rear door 21, defined as the angle between the closed position and the fully opened position, is limited to approximately 72° by door check link 13, but can vary from vehicle to vehicle. Notably, the OEM door hinges 30 have a swing angle ($SA_H$) of 80°. In that regard, the door 21 has an overextended position of 80°. Stated another way, but for the door check link 13, the swing angle ($SA_D$) of the rear door 21 would be 80°. In any event, the rear door 21 in its original fully opened position has an obstructive width ($W_O$) along a longitudinal plane (as viewed in a lateral direction, as shown) that significantly blocks the available width ($W_A$) of the door opening 2. Consequently, the usable width ($W_U$) of the OEM rear door assembly 20 is not wide enough to accommodate a vehicle access device, such as a ramp, or a wheelchair.

Figure 3:
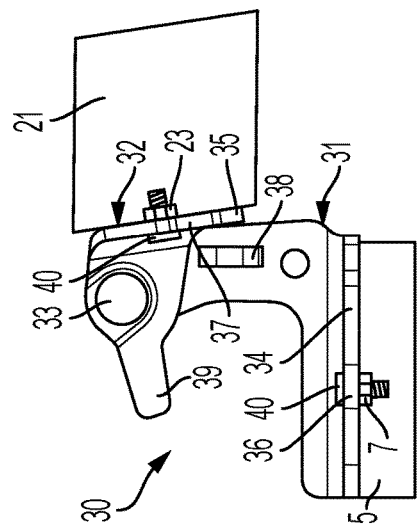
FIG. 3 is a top view of the door hinge of FIG. 2 with the door in a closed position.
Figure 4:
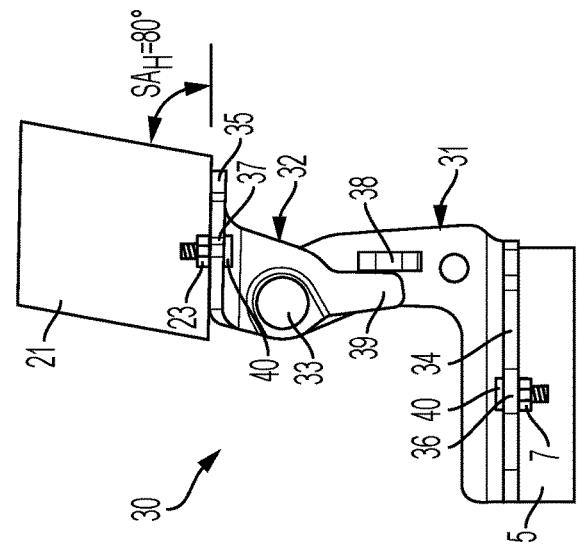
FIG. 4 is a top view of the door hinge of FIG. 3 with the door in the in an overextended position.
Figure 2:
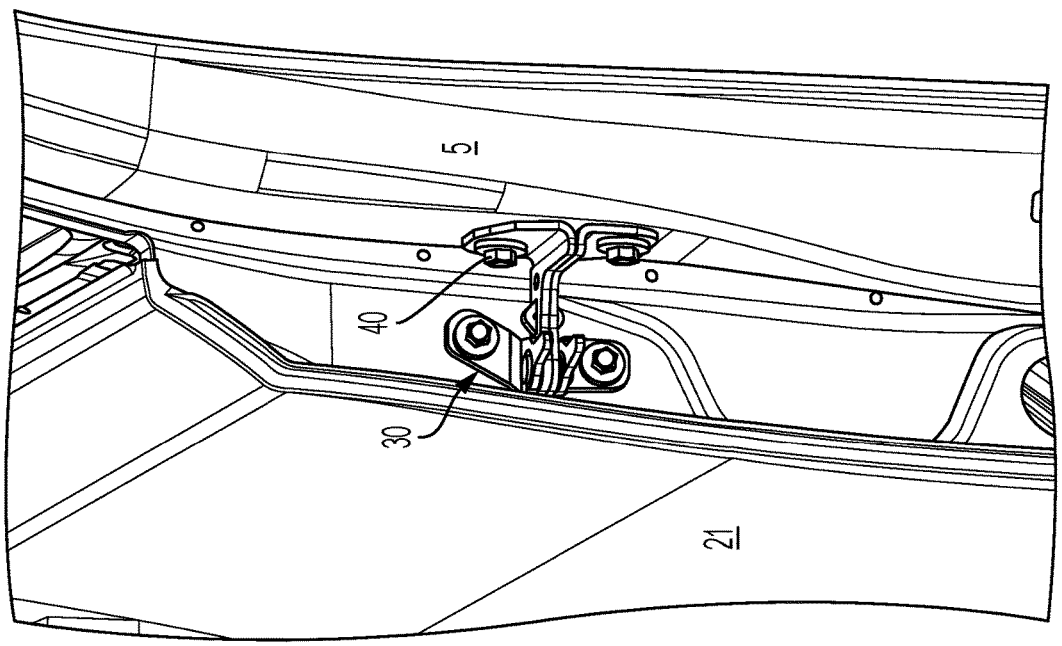
FIG. 2 is a perspective view of a door hinge of the prior art vehicle of FIG. 1 with the door in a closed position.

FIGS. 2-4 illustrate perspective and top views of the OEM hinge 30, assuming the door check link 13 has been removed and the door is allowed to open to its overextended position. The hinge 30 includes a body portion 31 connected to a door portion 32 at a pivot point (or hinge pin or hinge axis) 33, whereby the door portion 32 can rotate relative to the body portion between a closed position (FIGS. 2-3) and an overextended position (FIG. 4). The body portion 31 includes a body flange 34 configured to be attached to the vehicle body 2, while the door portion includes a door flange 35 configured to be attached to the vehicle door 21. In the depicted embodiment, the body flange 34 includes apertures 36 that align with apertures or threaded bores 7 in the B-pillar 5 of the vehicle body 2. Fasteners 40 are inserted through the apertures 36 and engage with threaded bores 7 (or nuts inserted behind corresponding apertures 7 in the vehicle body 2) to secure the hinge 30 to the vehicle body 2. Similarly, the door flange 35 includes apertures 37 that align with apertures or threaded bores 23 in the door 21. Fasteners 40 are inserted through the apertures 37 and engage with threaded bores 23 (or nuts inserted behind corresponding apertures 23) to secure the hinge 30 to the door 21. The body portion 31 and the door portion 32 each include stop members 38, 39 that are configured to engage when the door 21 is in the overextended position, as shown in FIG. 4.

In the closed position shown in FIGS. 2-3, the door 21 is approximately aligned with a longitudinal axis of the vehicle (from front to back) and a door latch/locking member (not shown) on a rear edge of the rear door 21 may engage with a corresponding latch/locking member (not shown) disposed on the vehicle's C-pillar 6. In the overextended position shown in FIG. 4, the rear door 21 is pivoted outward about the hinge axis 33 with a swing angle ($SA_H$) of approximately 80°. For the avoidance of doubt, it is noted that the OEM vehicle includes door check link 13 which limits the swing angle ($SA_D$) to 72° (which can vary from vehicle to vehicle) to allow ingress/egress to/from a rear passenger compartment of the vehicle) and to prevent the rear door 21 from contacting the front door 11 (or any other portion of the vehicle) and from blocking operation of the front door 11 between its open and closed positions.

While the hinge 30 of the existing, OEM vehicle is coupled between an outwardly facing surface of the b-pillar 5 and a front edge of the door 21, other OEM vehicles and doors may have different configurations with the hinges 30 mounted to different surfaces of the vehicle body 2 and door 21. For the avoidance of doubt, modifications of those other OEM vehicles are contemplated as being within the scope of the embodiments described herein.

Figure 5:
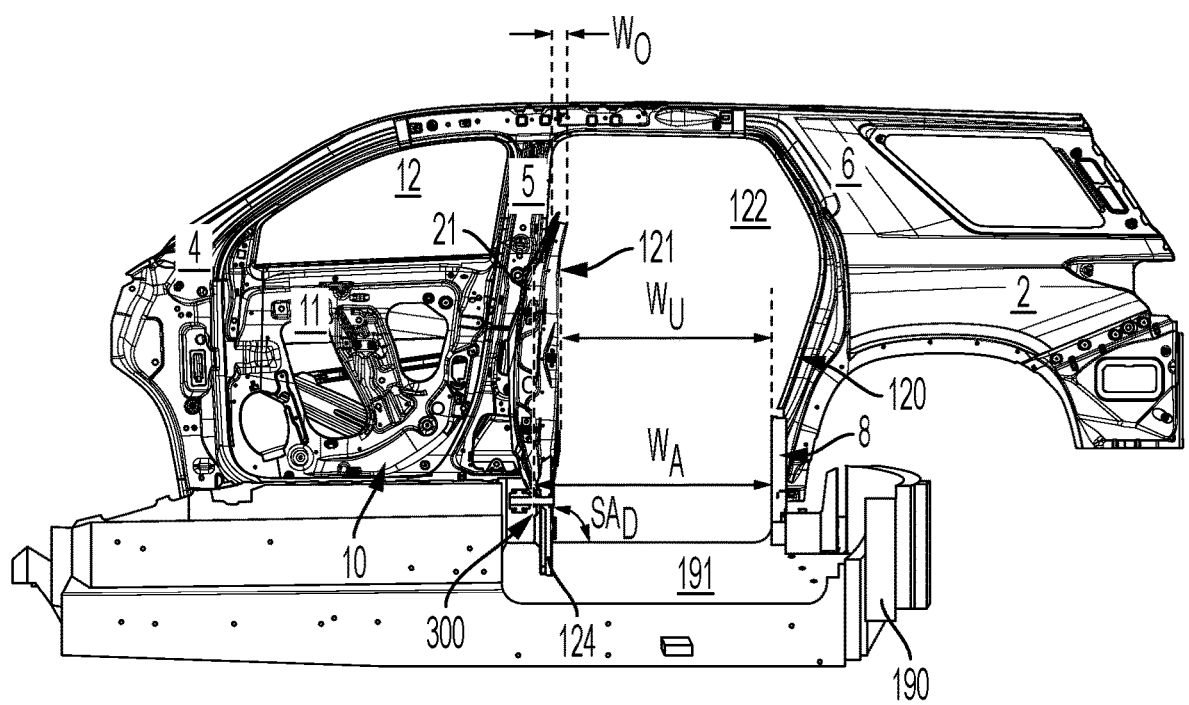
FIG. 5 illustrates an interior of the existing vehicle of FIG. 1 with a modified rear door assembly of the present embodiments with a modified rear door in a fully open position.

FIG. 5 illustrates the existing vehicle 1 with a modified rear door assembly 120 that is designed to accommodate a wheelchair and a wheelchair access device. More particularly, a swing angle ($SA_D$) of a rear door 121 of the modified rear door assembly 120 is increased as compared to the swing angle of the rear door 21 of the original (or OEM) rear door assembly 20. In one embodiment, the swing angle ($SA_D$) of the rear door 121 is increased to approximately 90°, and more particularly 93°. In other embodiments, the swing angle ($SA_D$) can be increased to a range of approximately 80°, 85° or 90° on a low end and approximately 95°, 100° or greater on a high end.

Notably, the obstructive width ($W_O$) of the rear door 121 of the modified rear door assembly 120 is smaller than the obstructive width ($W_O$) of the rear door 21 of the OEM rear door assembly 20. In some embodiments, the obstructive width ($W_O$) of the rear door 121 of the modified rear door assembly 120 may be approximately equal to the thickness of the rear door 121 that extends into the door opening 122. Consequently, the usable width ($W_U$) of the rear door assembly 120 is larger than the usable width ($W_U$) of the rear door assembly 20.

In some embodiments, a portion 8 of the C-pillar 6 may be removed, the available width ($W_A$) of the rear door opening 122 of the modified rear door assembly 120 will be larger than that of the OEM rear door opening 22, as shown. Additionally, at least a portion of the floor of the vehicle can be removed and replaced with a lowered replacement floor assembly 190 that may include an in-floor ramp assembly 191 with a ramp platform that deploys through the rear door opening 122. To accommodate the lowered floor, the modified door 121 may comprise the OEM door with an extension panel 124 added to its bottom edge to increase the height the OEM door 21.

The aforementioned features of the modified rear door assembly 120 can be obtained by removing and/or modifying the door check link 13 (if present in the OEM vehicle) and/or modifying the stops 38, 39 on the OEM hinge 30. For example, material can be removed from either one or both of the stop members 38, 39 to allow the hinge 30 to provide a greater swing angle. A similar effect may be achieved by removing and/or replacing one or both of the stops 38, 39 with alternative stops.

Alternatively, the aforementioned features of the modified rear door assembly 120 can be obtained by removing and/or modifying the door check link 13 (if present in the OEM vehicle) and/or replacing the OEM hinge 30 with a replacement hinge that provides the enlarged swing angle ($SA_D$). For instance, FIGS. 6-8 illustrate perspective and top views of an example replacement hinge 130. The hinge 130 includes a body portion 131 connected to a door portion 132 at a pivot point (or hinge pin or hinge axis) 133, whereby the door portion 132 can rotate relative to the body portion between a closed position (FIGS. 6-7) and a fully open position (FIG. 8). The body portion 131 includes a body flange 134 configured to be attached to the vehicle body 2, while the door portion includes a door flange 135 configured to be attached to the vehicle door 21. Ideally, in the closed position as shown in FIGS. 6-7, modified door 121 will be in the same position vis-à-vis the B-pillar 5 and C-pillar 6 (or door opening 22, 122) as the OEM door 21. This configuration permits the OEM door latch/locking members to be used with the modified door assembly 120, e.g., with at most only minor adjustment being necessary. To achieve that result, the relative positions of the body and door flanges 134, 135 (e.g., the apertures 136, 137) of the replacement hinge 130 in some embodiments be substantially the same as the relative positions of the body and door flanges 34, 35 (e.g., the apertures 36, 37) of the OEM hinge. In that way, the replacement hinge 130 can use the same mount points on the vehicle 2 and door 21 and fasteners 40 as the OEM hinge 30.

More particularly, the body flange 134 may include apertures 136 that, like apertures 36, align with apertures or threaded bores 7 in the B-pillar 5 of the vehicle body 2. Fasteners 40 (which may be the OEM fasteners used to secure the OEM hinges 30) may be inserted through the apertures 136 and engage with threaded bores 7 (or nuts inserted behind corresponding apertures 7 in the vehicle body 2) to secure the hinge 130 to the vehicle body 2. Similarly, the door flange 135 may include apertures 137 that, like apertures 37, align with apertures or threaded bores 23 in the door 21 when the door 21 is in the closed position. Fasteners 40 (which may be the OEM fasteners used to secure the OEM hinges 30) may be inserted through the apertures 137 and engage with threaded bores 23 (or nuts inserted behind corresponding apertures 23) to secure the hinge 130 to the door 21. The body portion 131 and the door portion 132 each may include stop members 138, 139 that are configured to engage when the door 21 is in the fully open position, as shown in FIG. 8. The stop members 138, 139 may be in different relative positions as compared to stop members 38, 39 to allow the increased swing angle ($SA_D$) of the modified door assembly 120. In the disclosed embodiment, the door check link 13 is removed such that the swing angle ($SA_D$) of the door 121 is the same as the swing angle ($SA_H$) of the hinge 130. Stated another way, the overextended position is the same as the fully open position of the door 121.

In the closed position shown in FIGS. 6-7, the door 121 is approximately aligned with a longitudinal axis of the vehicle (from front to back) and an OEM door latch/locking member (not shown) on a rear edge of the rear door 121 may engage with a corresponding OEM latch/locking member (not shown) disposed on the vehicle's C-pillar 6. In the fully open position shown in FIG. 8, the rear door 121 is pivoted outward about the hinge axis 133 with a swing angle ($SA_D$) of approximately 93° to allow ingress/egress to/from a rear passenger compartment of the vehicle by a wheelchair passenger.

Figure 9:
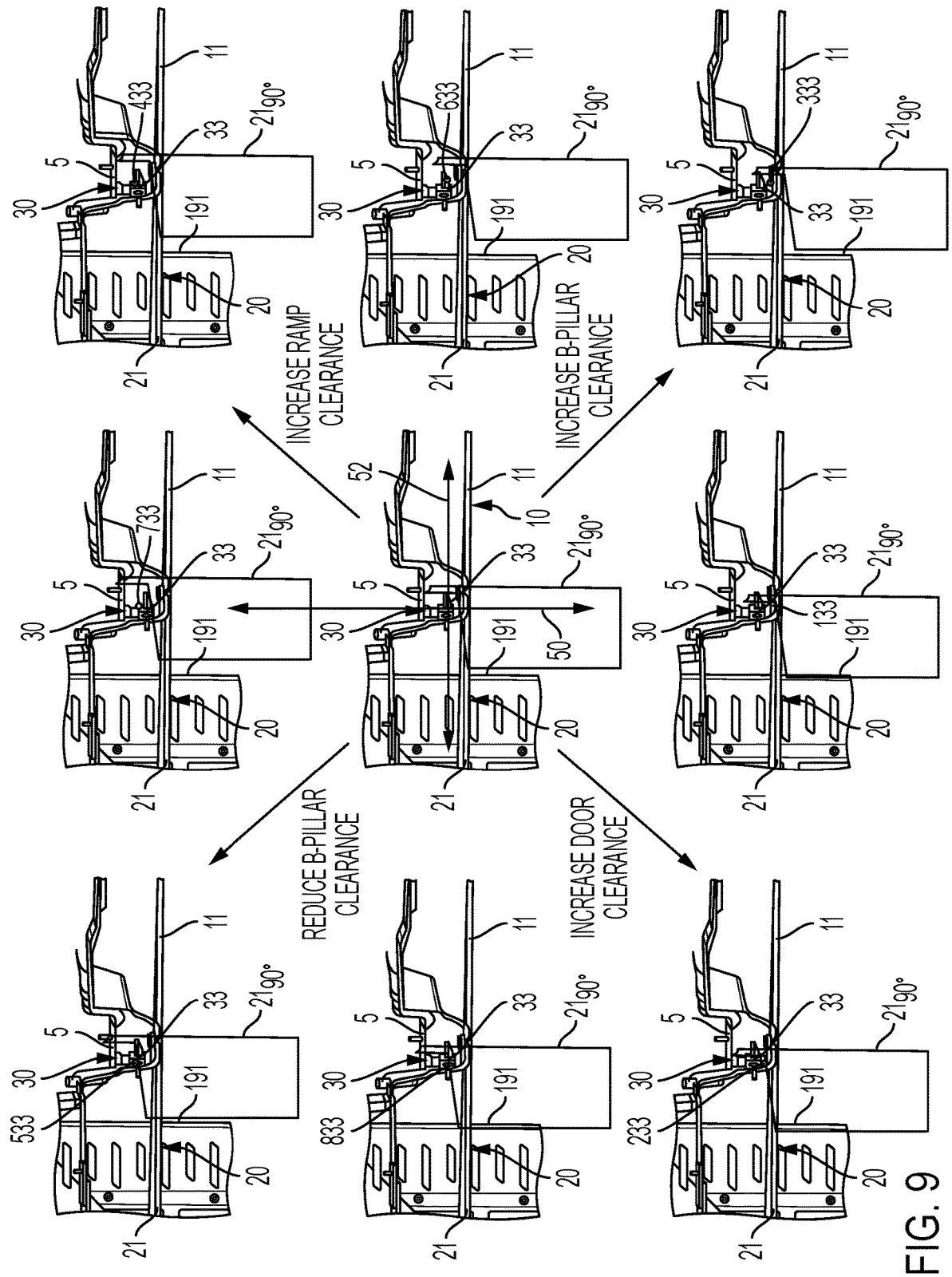
FIG. 9 is a grid of top views of various modified door hinges showing how moving the hinge axis affects clearances of a rear door with the B-pillar, the ramp, and a front door.

To achieve the increased swing angle ($SA_D$) of 93°, it was found that moving the hinge axis 133 from the position of the OEM hinge axis 33 to a different position can help overcome several design hurdles, including but not limited to: (1) avoiding hitting or interfering with the operation of the front door 11, (2) ensuring the ramp does not hit the door as the ramp deploys/stows, and (3) avoiding hitting the vehicle body 2, including the B-pillar 5. FIG. 9 illustrates these design considerations/hurdles and demonstrates how moving the hinge axis 33 in different directions for the particular geometry of the present hinge 30 can help/hurt.

With reference to the central figure in FIG. 9, the OEM rear door assembly 20 is shown adjacent the OEM rear front door assembly 10 with the door 21 shown in its closed position. While the hinge 30 includes the OEM hinge axis 33, it has been modified to allow the door to open to a swing angle ($SA_D$) of approximately 90°, for example by removing the stops 38, 39. For this particular vehicle 1 and hinge 30 geometry, the 90° open door $21_{90}°$ (dashed lines) provides the necessary clearance for the ramp 191 platform, but provides inadequate clearance for the front door 11 and B-pillar 5.

The bottom-left illustration in FIG. 9 illustrates the 90° open position of door $21_{90}°$ in dashed lines if the hinge axis 33 of the central figure is moved a distance in both a lateral direction 50 outward (away from the vehicle body 2 and B-pillar 5) and a longitudinal direction (52) rearward (away from the front door 11) to modified hinge axis 233. With hinge axis 233, the 90° open door $21_{90}°$ (dashed lines) is shifted in a longitudinal direction 52 rearward as compared to the central figure to provide additional clearance for the front door 11.

The bottom-right illustration in FIG. 9 illustrates the 90° open position of door $21_{90}°$ in dashed lines if the hinge axis 33 of the central figure is moved a distance in both a lateral direction 50 outward and a longitudinal direction 52 forward to modified hinge axis 333. With hinge axis 333, the 90° open door $21_{90}°$ (dashed lines) is shifted in a lateral direction 50 outward as compared to the central figure to provide additional clearance for the B-pillar 5.

The top-right illustration in FIG. 9 illustrates the 90° open position of door $21_{90}°$ in dashed lines if the hinge axis 33 of the central figure is moved a distance in both a lateral direction 50 inward and a longitudinal direction 52 forward to modified hinge axis 433. With hinge axis 433, the 90° open door $21_{90}$ (dashed lines) is shifted in a longitudinal direction 52 forward as compared to the central figure to provide additional clearance for the ramp 191 platform.

The top left illustration in FIG. 9 illustrates the 90° open position of door $21_{90}°$ in dashed lines if the hinge axis 33 of the central figure is moved a distance in both a lateral direction 50 inward and a longitudinal direction 52 rearward to modified hinge axis 533. With hinge axis 533, the 90° open door $21_{90}°$ (dashed lines) is shifted in a lateral direction 50 inward as compared to the central figure to reduce clearance for the B-pillar 5.

With an understanding of how moving the hinge axis 33 affects the 90° open position of the door $21_{90}°$ for any given vehicle and hinge geometry, the modified hinge axis location can be optimized/selected to fine tune the desired open door position. In parallel, the fully open swing angle ($SA_D$) can also be optimized/varied slightly from 90°, either upward or downward as required. For the disclosed embodiment, it was found that using the OEM hinge axis 33 would result in a 90° open position of the door $21_{90}°$ with adequate ramp clearance, but inadequate B-pillar 5 clearance and front door 11 clearance (see center illustration in FIG. 9). To increase both B-pillar 5 clearance and front door 11 clearance, the hinge axis 33 of the central figure is moved to modified hinge axis 133 of the replacement hinge 130. As reflected in the bottom illustration of FIG. 9 and FIGS. 7-8, the hinge axis 133 may be positioned laterally outward a distance D from the vehicle body 2 relative to the position of the OEM hinge axis 33. With hinge axis 133, the 90° open door $21_{90}°$ (dashed lines) is shifted in both a lateral direction 50 outward and a longitudinal direction 52 rearward as compared to the central illustration of FIG. 9 and FIGS. 2-3, to increase clearances from both the front door 11 and the B-pillar 5. Unfortunately, the 90° open door $21_{90}°$ (dashed lines) may not have adequate clearance from the ramp 191 platform. To provide the needed clearance from the ramp 191, the stops 138, 139 on the replacement hinge 130 are positioned to allow the door 21 to open to approximately 93°. With the hinge axis and swing angle optimized (e.g., in this embodiment: modified hinge axis 133 and increased swing angle ($SA_D$) of 93°), the door 21 not only will have adequate clearances from all portions of the vehicle 1, but also will not preclude the front door 11 from opening and closing.

Hypothetically, if the 90° open door $21_{90}°$ had inadequate ramp 191 and B-pillar 5 clearance, the hinge axis 33 could be moved in a longitudinal direction 52 forward to hinge axis 633 as shown in the right illustration of FIG. 9. Similarly, if the 90° open door $21_{90}°$ had inadequate ramp 191 clearance and more than adequate B-pillar 5 clearance, the hinge axis 33 could be moved in a lateral direction 50 inward to hinge axis 733 as shown in the top illustration of FIG. 9. Similarly, if the 90° open door $21_{90}°$ had inadequate front door 11 clearance and more than adequate B-pillar 5 clearance, the hinge axis 33 could be moved in a longitudinal direction 52 rearward to hinge axis 833 as shown in the left illustration of FIG. 9.

While the replacement hinge 130, like the OEM hinge 30, is coupled between an outwardly facing surface of the b-pillar 5 and a front edge of the door 21, other OEM vehicles and doors may have different configurations with the hinges 30 mounted to different surfaces of the vehicle body 2 and door 21. For the avoidance of doubt, the replacement hinge may have other configurations, with the body/door portions 131, 132 and body/door flanges 134, 135 matching the configuration OEM hinge being replaced.

In some cases, the configuration and geometry of the OEM hinge may lend itself to being modified/remanufactured to match the desired configuration of the replacement hinge. In such cases, to avoid waste, the OEM hinge removed from a first vehicle may be modified/remanufactured and then reinstalled on the same vehicle or, more likely, a second vehicle being converted for use by wheelchair passengers.

Figure 10:
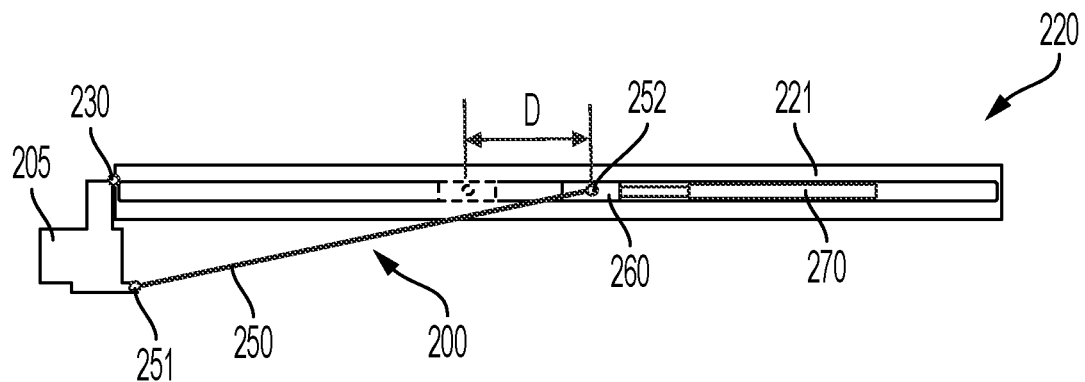
FIG. 10 is a schematic top view of a powered fourbar slider-crank door opener with the door in a closed position.
Figure 11:
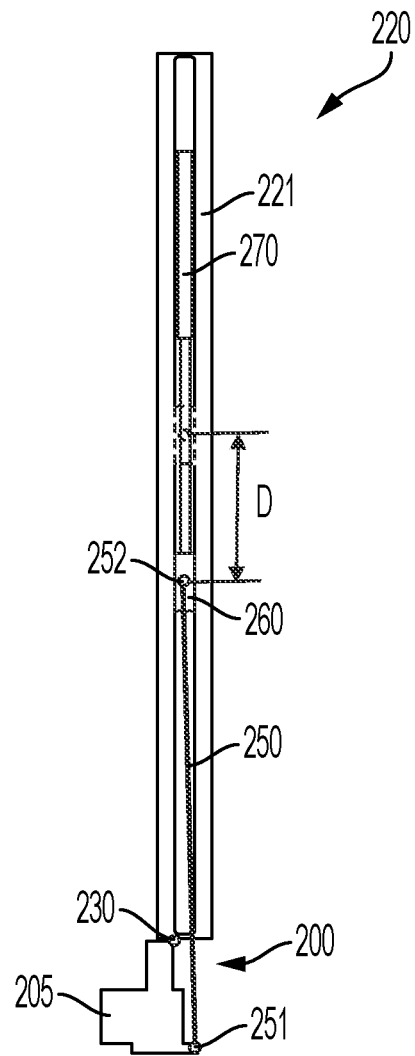
FIG. 11 is a schematic top view of the powered fourbar slider-crank door opener of FIG. 9 with the door in an open position.

In some embodiments, a powered swing door opening apparatus 200, shown schematically in FIGS. 10-11, may be utilized to automatically open and close a door assembly 220. The door assembly 220 may comprise a door 221 coupled to a pillar 205 or other structure of a vehicle via a hinge 230. The door 221 can be any door of a vehicle, including but not limited to a front door 11 and a rear door 21. Similarly, the pillar 205 may be any pillar of the vehicle, including but not limited to an A-pillar 4 and a B-pillar 5. The hinge 230 may take the form as an OEM hinge 30, a modified/replacement hinge 130, or other mechanism that allows the door 221 to pivot/swing relative to the vehicle.

The powered swing door opening apparatus 200 may comprise a fourbar slider-crank link mechanism having four links: (1) the vehicle/pillar 205; (2) the door 221; (3) a slider link/block 260; and (4) a pivot link (connecting rod) 250. The vehicle/pillar 205 may be a "ground link." The door 221 may be a "rocker link" that is pivotally connected to the vehicle/pillar 205 at pivot point/hinge 230 for pivoting/"rocking" relative to the vehicle/pillar 205 between the closed position in FIG. 10 and the open position in FIG. 11. Similarly, the pivot link 250 may be a "rocker link" that is pivotally connected to the vehicle/pillar at pivot point 251 for pivoting/"rocking" relative to the pillar 205. In this embodiment, pivot point 251 is aligned along the same axis as (i.e., generally parallel to) pivot point 230, but is spaced therefrom, e.g., horizontally. The slider block 260 may be disposed between the door 221 and the pivot link 250. More particularly, the slider block 260 is configured to slide back and forth a distance D along a width of the door 221 and may be pivotally connected to the pivot link 250 at pivot point 252, where pivot point 252 and pivot point 251 may be at opposite ends of the pivot link 250. Comparison of FIGS. 10 and 11 illustrates that moving the slider block 260 toward the front edge of the door 221 (i.e., toward the pivot point 230) causes the door 221 to swing open, and moving the slider block 260 toward a rear edge of the door 221 (i.e., away from the pivot point 230) causes the door to swing closed. Various mechanisms may be used to power the door opening apparatus 200. In one embodiment, the slider block 260 is powered between its closed position (FIG. 10) and its open position (FIG. 11). For instance, as shown, a linear actuator 270 may be used, where one end of the linear actuator 270 is fixed to the door 221 and the opposite end is fixed to the slider block 260. In another embodiment, the pivot link 250 may be powered for rotation about its pivot point 251. In yet another embodiment, the door 221 may be powered for rotation about its hinge 230.

Figure 12:
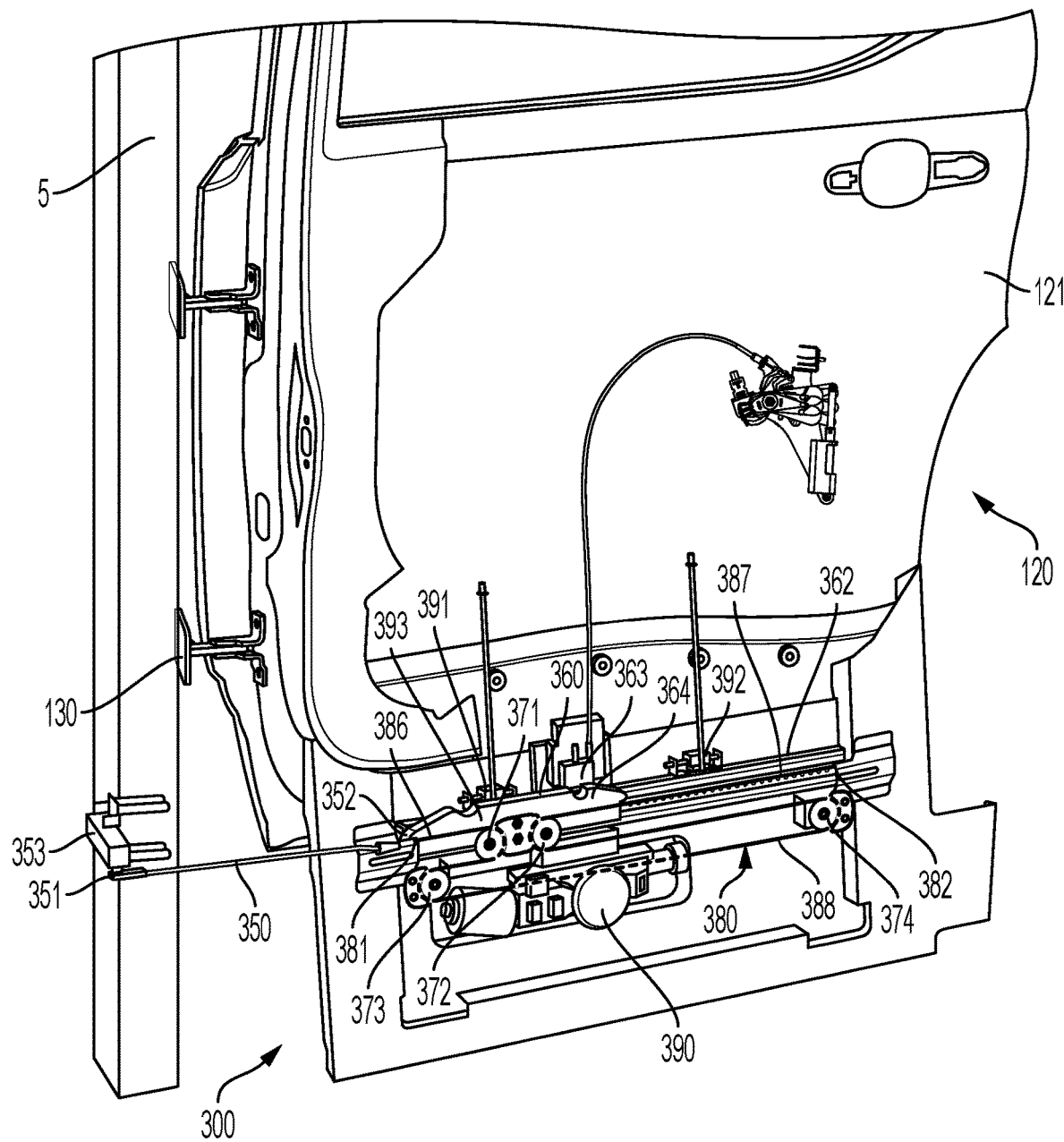
FIG. 12 is a perspective view of the powered door opener of the modified rear door assembly of FIG. 5 with the door in the open position.
Figure 13:
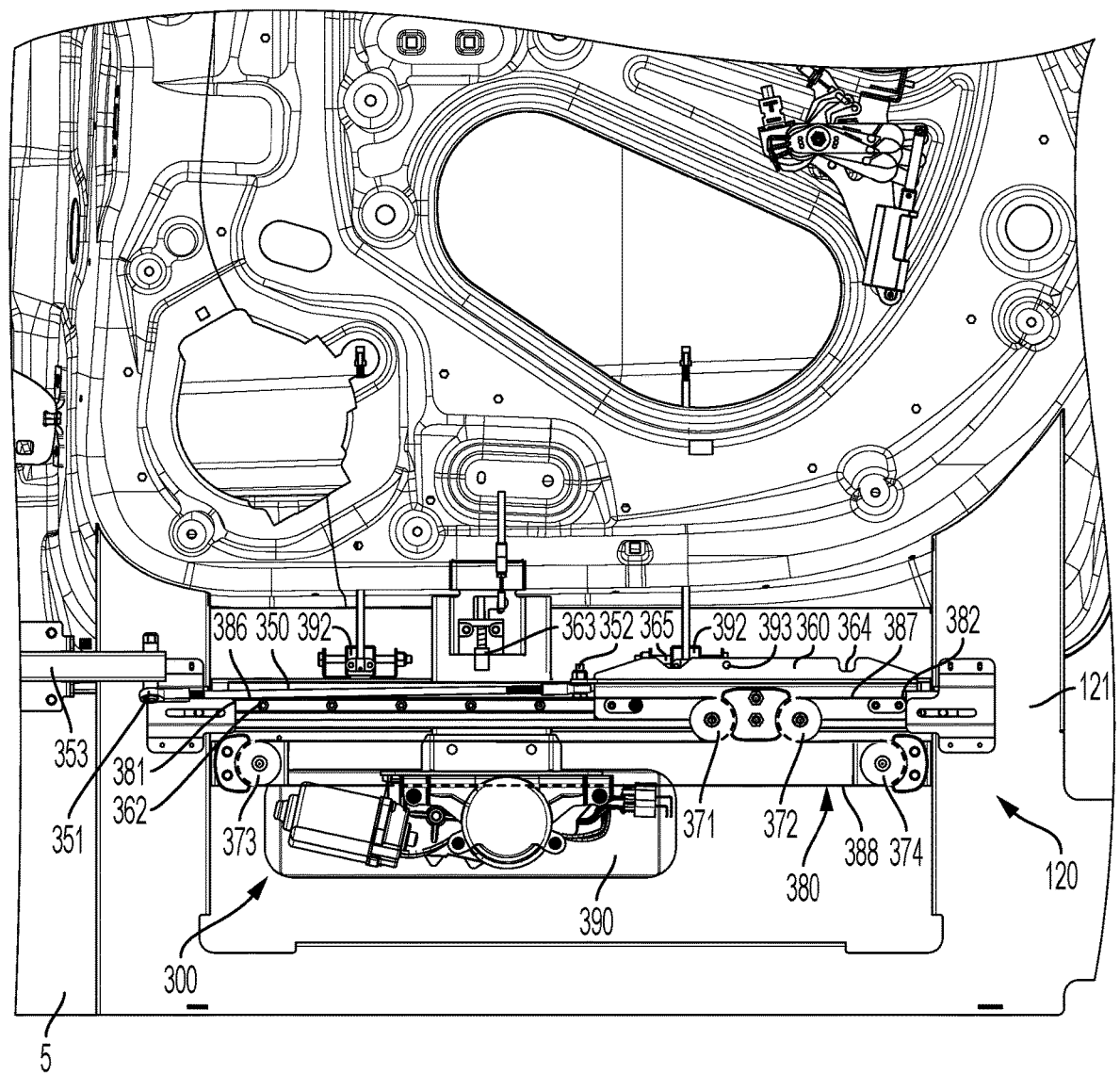
FIG. 13 illustrates the power door opener of the modified rear door assembly of FIG. 5 with the door in the closed position.

One specific implementation of a powered swing door opening apparatus 300 utilizing a fourbar slider-crank link mechanism is shown in FIGS. 5 and 12-13 having four links: (1) the vehicle/pillar 5; (2) the door 121; (3) a slider link/block 360; and (4) a pivot link/connecting rod 350). The pillar 5 is a "ground link." The door 121 is a "rocker link" that is pivotally connected to the pillar 5 at hinge 130 for pivoting/"rocking" relative to the pillar 5 between the closed position in FIG. 13 and the open position in FIGS. 5 and 12. Similarly, the connecting rod 350 is a "rocker link" that is pivotally connected to the pillar 5 at pivot point 351 for pivoting/"rocking" relative to the pillar 5. In this embodiment, pivot point 351 is aligned along the same axis as (i.e., generally parallel to) the pivot axis of hinge 130, but is spaced therefrom, e.g., horizontally. The slider block 360 is disposed between the door 121 and the connecting rod 350. More particularly, the slider block 360 is configured to slide back and forth a distance along a width of the door 121. In the depicted embodiment, the slider block 360 is fixed to at least one carriage member (not shown) that is engaged in linear rail 362 for sliding movement along a length of the linear rail 362. The slider block 360 is pivotally connected to the connecting rod 350 at pivot point 352, where pivot point 352 and pivot point 351 may be at opposite ends of the connecting rod 350. As shown, pivot point 351 may be disposed on a bracket 353 which is fixed to the pillar 5. Comparison of FIGS. 12 and 13 illustrates that moving the slider block 360 toward the front edge of the door 121 (i.e., toward the hinge 130) causes the door 121 to swing open, and moving the slider block 360 toward a rear edge of the door 121 (i.e., away from the hinge 130) causes the door to swing closed.

Various mechanisms and/or motor assemblies may be used to power the slider block 360 between its open position adjacent one end of the linear rail 362 (see FIG. 12) and its closed position adjacent the opposite end of the linear rail 362 (see FIG. 13). In one embodiment, the motor assembly 370 may comprise a mechanical advantage system, such as a pulley system, which powers the slider block. The pulley system may comprise, as depicted, a reciprocating pulley system 370 configured to shuttle the slider block 360 back and forth between its open and closed positions. More particularly, the reciprocating pulley system may comprise an open loop cable 380 that is fixed to the door 121 at a first cable end 381 adjacent a first rail end of the linear rail 362 and is fixed to the door 121 at an opposite/second cable end 382 adjacent the opposite/second rail end of the linear rail 362. In a first segment 386, the cable 380 extends from the first cable end 381 to a first shuttle pulley 371, wherein the first shuttle pulley 371 is fixed to the slider block 360 for rotation about its axis. In a second segment 387, the cable 380 extends from the second cable end 372 to a second shuttle pulley 372, wherein the second pulley 372 is fixed to the slider block 360 for rotation about its axis. In a central segment 388 located between the first and second shuttle pulleys 372, the cable 380 passes through or engages with a pulley motor 390. The pulley motor 390 may be configured to operate in a first direction to pull cable 380 from the first segment 386 into the central segment 388 and provide cable 380 from the central segment 388 to the second segment 387, whereby the length of the first segment 386 is shortened and the length of the second segment 387 is lengthened. In that respect, the slider block 360 may be moved from the closed position shown in FIG. 13 to the open position shown in FIG. 12. The pulley motor 390 may also be configured to operate in a second direction to pull cable 380 from the second segment 387 into the central segment 388 and provide cable 380 from the central segment 388 to the first segment 386, whereby the length of the second segment 387 is shortened and the length of the second segment 386. is lengthened. In that respect, the slider block 360 may be moved from the open position shown in FIG. 12 to the closed position shown in FIG. 13.

In one embodiment, the pulley motor 390 may be fixed to and move with the slider block 360. In other embodiments, as shown, the pulley motor 390 is fixed to the door 121. To enable this configuration, the central segment 388 of the cable 380 may pass through additional fixed pulley(s) 383, 384, each fixed to the door 121 for rotation about its axis. More particularly, the cable 280 may extend from the first shuttle pulley 381 to a first fixed pulley 383 disposed adjacent the first rail end of the linear rail 362, from the first fixed pulley 383 to a second fixed pulley 384 disposed adjacent the second rail end of the linear rail, and then from the second fixed pulley 383 to the second shuttle pulley 382. While the pulley motor 390 is shown engaging with the cable 280 between the first and second fixed pulleys 383, 384, in other embodiments the pulley motor 390 may engage with the cable between the first shuttle pulley 381 and the first fixed pulley 383, or between the second fixed pulley 384 and the second shuttle pulley 382. The pulley mechanism as shown in FIGS. 12-13 results in a doubling of force from the motor 390 to the slider block 360.

The pulley motor 390 may include a normally open clutch, whereby the powered door opening apparatus 300 will be "unlocked"; i.e., the slider block 360 will freely slide back and forth along the length of the linear rail 362 whereby the door 121 may be manually opened and closed. When power is applied, the clutch closes whereby the powered door opening apparatus will be "locked" and the motor can be powered to drive the cable 380 to automatically open and close the door. In one embodiment, the pulley motor 390 is an off the shelf component, such as the motor assembly used with Mopar part number 68303288AC.

For the avoidance of doubt, the term "cable" is used herein in a broad sense to include ropes, wire cables, plastic cables, belts, etc.

The powered door opening mechanism 300 may include at least one detent or detent mechanism for holding the door 121 in one or both of the open position or closed position. In the depicted embodiment, the detent mechanism comprises a first detent member, a plunger 363, fixed to the door 121 that engages with a corresponding or second detent member, a recessed area 364, in the slider block 360 when the slider block 360 is in the open position. The plunger 363 may be spring-loaded or otherwise biased into the engaged or "locked" position with the recessed area 364. The slider block 360 may include a third detent member, recessed area 365, that is positioned to engage with the plunger 363 when the door 121 is in a midway open position to hold the door 121 in the midway open position. The recessed area 365 includes chamfered or contoured ends that will urge the plunger 363 upward and out of engagement with recessed area 365 when mild force is applied to the door 121 in either direction by hand.

In alternative embodiments, the plunger 363 may be fixed to the slider block 360 and the recessed areas 364, 365 may be fixed to the door 121.

Figure 14:
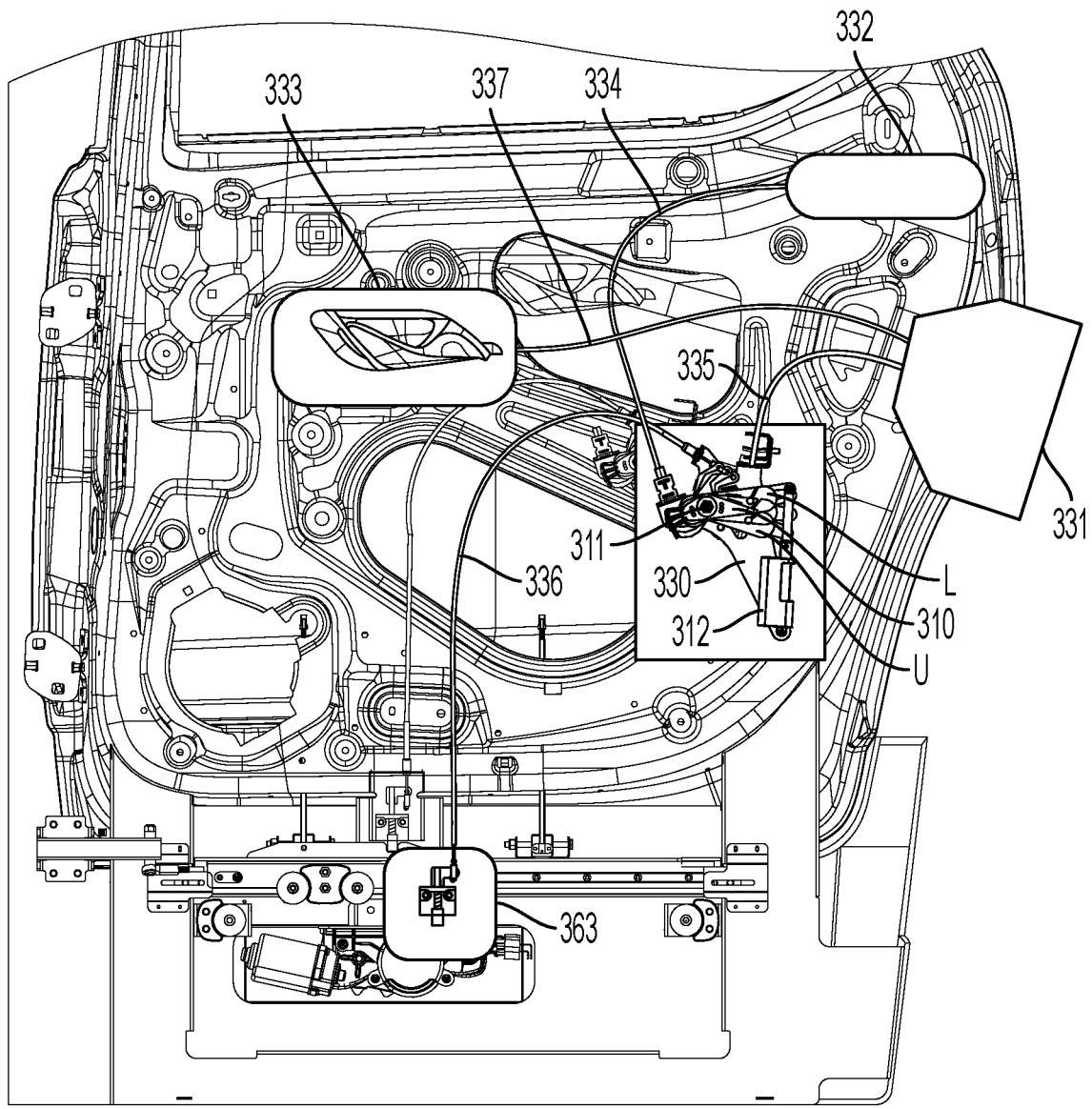
FIG. 14 is a schematic illustrating the latch release mechanism for the modified rear door assembly of FIG. 5.

As depicted in FIG. 14, the plunger 363 is retractable via a latch release mechanism 330. The latch release mechanism 330 includes a lever 310 coupled to the door for rotation about pivot point 311. The lever 310 is pivotable between a locked position L and an unlocked position U. The lever 310 is coupled to the plunger 363 via cable 336. When the lever 310 is in the locked position L, the plunger 363 is deployed and may be received in recessed area 364 to hold the door 121 in its open position. Further, the lever 310 is coupled to the OEM door latch, which closes against a striker (not shown) on the C-pillar 6, via cable 335. When the lever 310 is in the locked position L, the OEM door latch 331 remains engaged with the striker (not shown). The lever 310 is also coupled to the exterior door handle 332 via cable 334, whereby operating the door handle 332 causes the lever 310 to move to the unlocked position U, thereby simultaneously causing the plunger 363 to retract and the OEM door latch 331 to release. In that respect, if the door 121 is fully open, the plunger 363 will disengage from the recessed area 364 allowing a user to close the door 121. If the door 121 is fully closed, the OEM door latch 331 will disengage from the striker (not shown) allowing a user to open the door 121. As shown, the interior door handle 333 may be coupled directly to the OEM door latch 331 via cable 337, as provided by the OEM. In alternative embodiments, the interior door handle 333 may be coupled to the lever 310 in the same way as the exterior door handle 332.

The release mechanism 330 may include a powered actuator 312 coupled to the lever 310 to move it between the locked position L and the unlocked position U. The powered actuator 312 may be electrically coupled (wired or wireless) to a remotely located button or user panel, whereby a user can remotely open and close the door at the push of a button.

In other embodiments, the plunger 363 may include a solenoid that retracts the plunger 363 against the bias when powered (for example, at the same time as pulley motor 390 is powered) to disengage the plunger 363 from the recessed area 364.

The powered door opening assembly 300 may also include one or more sensors that detect when the door 121 is in the open or closed. The sensor output may be used by a controller (not shown) for the pulley motor 390 to determine an appropriate direction to operate the motor and/or to determine when to stop the motor from operating. The controller may additionally or alternatively use motor current sensors to determine when the door is open or closed.

In one embodiment, at least one hall effect sensor is secured to the door 121 for sensing at least one magnet secured to the slider block 260. In the depicted embodiment, a magnet 393 is provided on the slider block 360. A first hall effect sensor 391 is disposed on the door 121 and positioned to detect the magnet 393 when the door 121 is in the open position (see FIG. 12), while a second hall effect sensor 392 is disposed at a different location on the door 121 and positioned to detect the magnet 393 when the door 121 is in the closed position (see FIG. 13).

Figure 15:
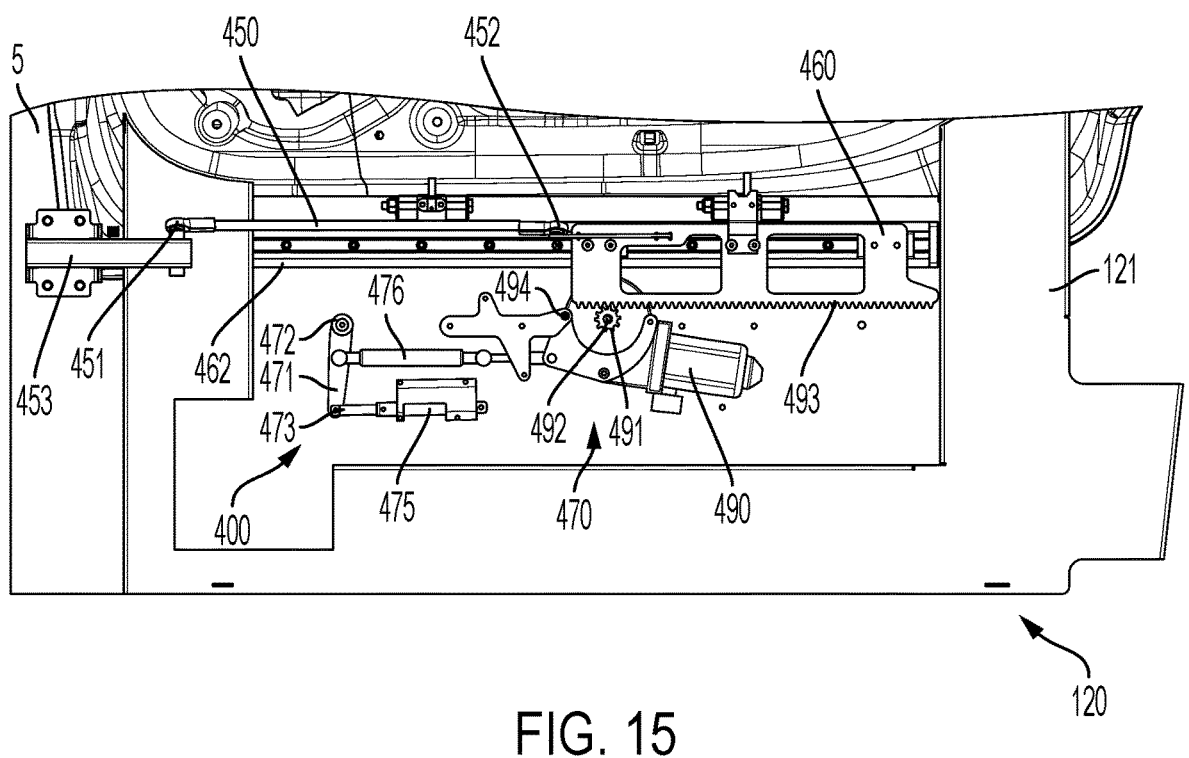
FIG. 15 illustrates an alternative motor assembly and slider block for the power door opener of FIG. 5.

A second implementation of a powered swing door opening apparatus 400 utilizing a fourbar slider-crank link mechanism to open and close the door 121 of the door assembly 120 is shown in FIG. 15 having four links: (1) the vehicle/pillar 5; (2) the door 121; (3) a slider link/block 460; and (4) a pivot link/connecting rod 450. The pillar 5 is a "ground link." The door 121 is a "rocker link" that is pivotally connected to the pillar 5 at hinge 130 for pivoting/ "rocking" relative to the pillar 5 between the closed position in FIG. 15 and the open position in FIG. 5. Similarly, the connecting rod 450 is a "rocker link" that is pivotally connected to the pillar 5 at pivot point 451 for pivoting/ "rocking" relative to the pillar 5. In this embodiment, pivot point 451 is aligned along the same axis as (i.e., generally parallel to) the pivot axis of hinge 130, but is spaced therefrom, e.g., horizontally. The slider block 460 is disposed between the door 121 and the connecting rod 450. More particularly, the slider block 460 is configured to slide back and forth a distance along a width of the door 121. In the depicted embodiment, the slider block 460 is fixed to at least one carriage member (not shown) that is engaged in linear rail 462 for sliding movement along a length of the linear rail 462. The slider block 460 is pivotally connected to the connecting rod 450 at pivot point 452, where pivot point 452 and pivot point 451 may be at opposite ends of the connecting rod 450. As shown, pivot point 451 may be disposed on a bracket 453 which is fixed to the pillar 5. It can be understood from FIG. 15 that moving the slider block 460 toward the front edge of the door 121 (i.e., toward the hinge 130) causes the door 121 to swing open, and moving the slider block 460 toward a rear edge of the door 121 (i.e., away from the hinge 130) causes the door 121 to swing closed.

Various mechanisms and/or motor assemblies may be used to power the slider block 460 between its open position adjacent one end of the linear rail 462 and its closed position adjacent the opposite end of the linear rail 462 (as shown in FIG. 15). In this embodiment, the motor assembly 470 may comprise a motor 490 fixed to the door 121, where the motor may include a pinion 491 coupled to its motor shaft 492. The pinion 491 is configured to engages with a gear rack 493 that may be formed on or connected to the slider block 460. Rotation of the motor shaft 492 in one direction (as shown, a clockwise direction) causes the slider block 460 to move to the closed position shown in FIG. 15. Rotation of the motor shaft 492 in an opposite direction (as shown, a counterclockwise direction) causes the slider block 46 to move to the open position at the opposite end of the linear rail 462. In alternative embodiments, the motor 490 and pinion 401 may be coupled to the slider block 460, while the gear rack 493 may be coupled to the door 121.

The motor assembly 470 may further include a clutch mechanism that allows the motor 490 to pivot about pivot point 494 between an engaged position (shown in FIG. 15) where the pinion 491 is engaged with the gear rack 493, and a disengaged position (not shown) where the pinion 491 is disengaged from the gear rack 493. When the motor assembly 470 is in the disengaged position, the slider block 460 is free to slide within the linear track 462 and the door 121 may be manually opened and closed. The clutch mechanism comprises lever 471 that is pivotally connected about the door at pivot point 472. The lever 472 is coupled to the motor 490 via link 472, whereby rotation of the lever 472 about pivot point 472 causes the motor 490 to rotate about pivot point 494. In that respect, the lever 471, the link 476, the motor 490, and the door 121 may be collectively defined as a fourbar rocker mechanism. The lever 471 may also be coupled to a linear actuator 475 to move the lever 471 back and forth and thereby move the motor 490 between its engaged and disengaged position. The link 476 may comprise a gas spring to "decouple" the linear actuator 475 from the motor 490 and rack and pinion mechanism. Instead of the actuator 475 directly pushing the pinion 491 into the rack 493, the actuator 475 indirectly pushes them together via the gas spring 476. This way, if the system is mechanically overpowered, the spring will compress and the pinion 491 and rack 493 will slip instead of the actuator taking the full load and breaking. As with the previous embodiment, the clutch mechanism may have a normally open position, whereby the powered door opening apparatus 400 will be "unlocked"; i.e., the slider block 460 will freely slide back and forth along the length of the linear rail 462 whereby the door 121 may be manually opened and closed. When power is applied, the clutch closes (i.e., the actuator 475 moves the motor 490 to the engaged position) whereby the powered door opening apparatus will be "locked" and the motor 490 can be powered to drive the rack and pinion assembly to automatically open and close the door 121.

Notably, the fourbar slider-crank link mechanism of the powered swing door opening apparatus 200, 300, 400 may take other forms. In some embodiments, the slider block may be pivotally fixed about the door and may reciprocate relative to the pivot link. For instance, a powered swing door opening apparatus 500, shown schematically in FIGS. 16-17, may be utilized to automatically open and close a door assembly 520. The door assembly 220 may comprise a door 521 coupled to a pillar 505 or other structure of a vehicle via a hinge 530. The door 521 can be any door of a vehicle, including but not limited to a front door 11 and a rear door 21. Similarly, the pillar 505 may be any pillar of the vehicle, including but not limited to an A-pillar 4 and a B-pillar 5. The hinge 530 may take the form as an OEM hinge 30, a modified/replacement hinge 130, or other mechanism that allows the door 521 to pivot/swing relative to the vehicle.

The powered swing door opener 500 may comprise a fourbar slider-crank link mechanism having four links: (1) the vehicle/pillar 505; (2) the door 521; (3) a slider link/ block 560; and (4) a pivot link (connecting rod) 550. The vehicle/pillar 505 may be a "ground link." The door 521 may be a "rocker link" that is pivotally connected to the vehicle/ pillar 505 at pivot point/hinge 530 for pivoting/"rocking" relative to the vehicle/pillar 505 between the closed position in FIG. 16 and the open position in FIG. 17. Similarly, the pivot link 550 may be a "rocker link" that is pivotally connected to the vehicle/pillar at pivot point 551 for pivoting/"rocking" relative to the pillar 505. In this embodiment, pivot point 551 is aligned along the same axis as (i.e., generally parallel to) pivot point 530, but is spaced therefrom, e.g., horizontally. The slider block 560 may be disposed between the door 521 and the pivot link 550. More particularly, the slider block 260 is configured to slide back and forth a distance along a length of the pivot link 550 and may be pivotally connected to the door 521 at pivot point

Figure 16:
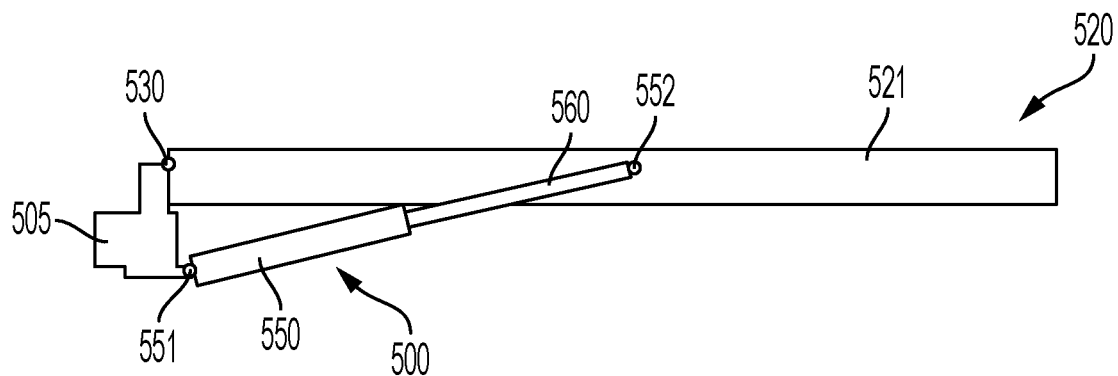
FIG. 16 is a schematic top view illustrating a second embodiment of a powered fourbar slider-crank door opener with the door in a closed position.
Figure 17:
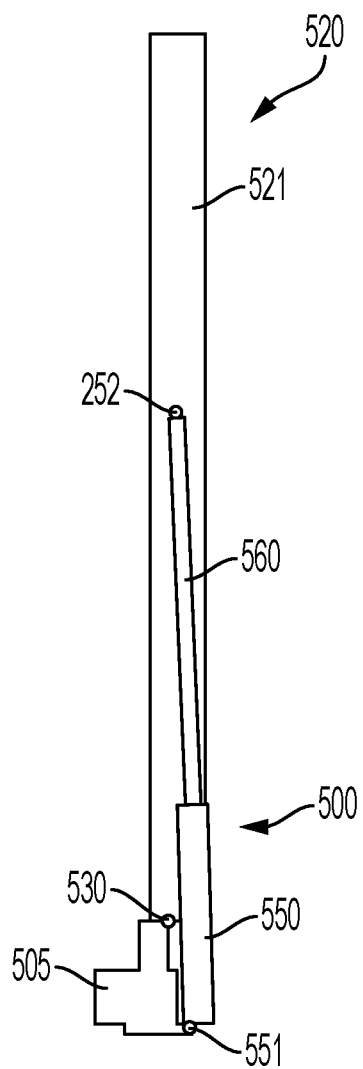
FIG. 17 is a schematic top view of the powered fourbar slider-crank door opener of FIG. 16 with the door in an open position.

552. Comparison of FIGS. 15 and 16 illustrates that moving the slider block 560 away from pivot point 551 causes the door 521 to swing open, and moving the slider block 560 toward the pivot point 551 causes the door 521 to swing closed. Various mechanisms may be used to power the door opening apparatus 500. In one embodiment, the slider block 560 is powered between its closed position (FIG. 16) and its open position (FIG. 17). For instance, the pivot link 550 and slider block 560 may be collectively defined by a linear actuator or a hydraulic/pneumatic cylinder and piston that increases in length to open the door and decreases in length to close the door. In another embodiment, the pivot link 550 may be powered for rotation about its pivot point 551. In yet another embodiment, the door 521 may be powered for rotation about its hinge 530.

For the avoidance of doubt, while the powered swing door opening apparatus 300, 400, 500 are described in connection with the modified door assembly 120, it is contemplated that it can be used with any hinged/swing door, including but not limited to both the modified door assembly 120 and the OEM door assembly 20 described herein.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of modifying an existing vehicle, wherein the existing vehicle includes a door assembly comprising at least a first hinge connecting a door to a vehicle body at a door opening whereby the door is pivotable about a first hinge axis of the first hinge relative to the vehicle body between an original closed position and an original fully open position, the method comprising the step of modifying the door assembly whereby the door is pivotable about a second hinge axis relative to the vehicle body between a modified closed position and a modified fully open position, the modified fully open position being different from the original fully open position wherein an obstructive width of the door blocking the door opening is decreased in the modified fully open position, wherein the modifying step comprises replacing the first hinge with a second hinge connecting the door to the vehicle body at the door opening whereby the door is pivotable about the second hinge axis of the second hinge relative to the vehicle body between the modified closed position and the modified fully open position.

2. The method of claim 1, wherein the second hinge axis is on a same side of the door as the first hinge axis, and a usable width of the door opening is increased in the modified fully open position.

3. The method of claim 1, wherein a first swing angle defined between the original fully open position and the original closed position is less than a second swing angle defined between the modified fully open position and the modified closed position.

4. The method of claim 3, wherein the first swing angle is less than 90°.

5. The method of claim 3, wherein the second swing angle is approximately 90° or greater.

6. The method of claim 1, wherein: the door is a rear passenger door; the existing vehicle further includes a front passenger door; the front passenger door is moveable between a closed position and a fully open position when the rear passenger door is in the modified fully open position.

7. The method of claim 1, wherein the modified closed position is substantially the same as the original closed position.

8. The method of claim 1, wherein the second hinge axis is different from the first hinge axis.

9. The method of claim 8, wherein the second hinge axis is substantially parallel to and offset a distance from the first hinge axis.

10. The method of claim 9, wherein the distance includes a laterally outward component relative to the vehicle body.

11. The method of claim 9, wherein a first swing angle defined between the original fully open position and the original closed position is less than a second swing angle defined between the modified fully open position and the modified closed position.

12. The method of claim 11, wherein: the door is a rear passenger door; the existing vehicle further includes a front passenger door; and the front passenger door is moveable between a closed position and a fully open position when the rear passenger door is in the modified fully open position.

13. The method of claim 12, wherein the first swing angle is less than 90°.

14. The method of claim 12, wherein the second swing angle is approximately 90° or greater.

15. The method of claim 11 wherein the modified closed position is substantially the same as the original closed position.

16. The method of claim 1, wherein the first hinge includes a first body flange for attachment to the vehicle body and a first door flange for attachment to the door, the first body flange being coupled to the first door flange at the first hinge axis whereby the first door flange is pivotable about the first hinge axis relative to the first body flange to permit the door to move between the closed position and the original fully open position.

17. The method of claim 16, wherein the second hinge includes a second body flange for attachment to the vehicle body and a second door flange for attachment to the door, the second body flange being coupled to the second door flange at the second hinge axis whereby the second door flange is pivotable about the second hinge axis relative to the second body flange to permit the door to move between the closed position and the modified fully open position.

18. The method of claim 17, wherein: the first body flange is attached to a body fastener point on the vehicle body; the first door flange is attached to a door fastener point on the door; the method further comprises the steps of:
   detaching the first body flange from the vehicle body and detaching the first door flange from the door; and,
   securing the second body flange to the body fastener point and the second door flange to the door fastener point.

19. The method of claim 17, wherein: at least one body fastener attaches the first body flange to a body fastener point on the vehicle body; at least one door fastener attaches the first door flange to a door fastener point on the door; and the method further comprises the step of: securing the second body flange to the body fastener point and the second door flange to the door fastener point using the at least one body fastener and the at least one door fastener.

20. The method of claim 1, further comprising the step of modifying the first hinge to be substantially the same as the second hinge.

21. The method of claim 20 further comprising the step of installing the modified first hinge in a second existing vehicle.

22. The method of claim 1, wherein the existing vehicle includes a door check link preventing the door from opening past the original fully open position, the method further comprising the step of removing the door check link.

23. The method of claim 1 wherein the existing vehicle includes a door check link preventing the door from opening past the original fully open position, the method further comprising the step of modifying a door check link to permit the door to open to the modified fully open position.

24. The method of claim 1 wherein the existing vehicle includes a first door check link preventing the door from opening past the original fully open position, the method further comprising the step of replacing the first door check link with a second door check link, whereby the second door check link allows the door to open to the modified fully open position.

* * * * *